United States Patent

Drew

[11] Patent Number: 5,433,576
[45] Date of Patent: Jul. 18, 1995

[54] LOW PROFILE DOLLY AND RAMP ASSEMBLY FOR A ROLL

[75] Inventor: Wilbur Drew, Dover, N.H.

[73] Assignee: Moore Business Forms, Inc., Grand Island, N.Y.

[21] Appl. No.: 221,012

[22] Filed: Apr. 1, 1994

[51] Int. Cl.6 .......................................... B65G 67/04
[52] U.S. Cl. .................................. 414/401; 414/911;
  414/537; 414/572; 414/343; 414/373; 414/584
[58] Field of Search ............... 414/608, 498, 911, 910,
  414/908, 276, 390, 401, 402, 584, 585, 397, 395,
  396, 373, 572, 572, 537, 343, 345, 222, 684;
  254/104

[56] References Cited

U.S. PATENT DOCUMENTS

| 1,495,339 | 5/1924 | Maher | 414/572 |
|---|---|---|---|
| 1,587,842 | 6/1926 | Knox . | |
| 2,326,684 | 8/1943 | Ross . | |
| 2,452,481 | 10/1949 | Morehead et al. | 414/911 X |
| 2,477,871 | 8/1949 | Grogan et al. . | |
| 2,792,134 | 5/1957 | Kinnee | 414/537 |
| 3,435,969 | 4/1969 | McCartney et al. | 414/343 X |
| 4,091,942 | 5/1978 | Shelton . | |
| 4,155,678 | 5/1979 | Lehman et al. . | |
| 4,240,773 | 12/1980 | Terry . | |
| 4,632,633 | 12/1986 | Avey . | |
| 4,696,616 | 9/1987 | Avey . | |
| 4,743,157 | 5/1988 | Takatsuki | 414/911 X |
| 4,930,967 | 6/1990 | Dovidauskas | 414/572 X |
| 4,936,733 | 6/1990 | Girerd . | |
| 5,037,265 | 8/1991 | O'Brien | 414/572 X |
| 5,161,932 | 11/1992 | Johnson . | |
| 5,253,972 | 10/1993 | Drew et al. . | |

FOREIGN PATENT DOCUMENTS

| 276231 | 11/1969 | Austria | 414/401 |
|---|---|---|---|
| 1019409 | 10/1952 | France | 414/537 |
| 3336836 | 5/1985 | Germany . | |
| 212601 | 9/1988 | Japan | 414/910 |
| 2201129 | 2/1987 | United Kingdom . | |
| 2231026 | 4/1989 | United Kingdom . | |

Primary Examiner—Frank E. Werner
Attorney, Agent, or Firm—Nixon & Vanderhye

[57] ABSTRACT

The combined dolly and ramp assembly includes a ramp having a pair of laterally spaced arms and an inclined ramp surface interconnecting the arms adjacent one end and at an elevation for receiving a roll of web material from a pallet. The dolly includes a frame mounted on casters and which has a pair of inclined surfaces meeting at an apex centrally of the dolly. The dolly is movable into an opening between the arms 16 of the ramp to align the inclined ramp with one of the inclined surfaces of the dolly. A foot-actuated latch automatically and releasably locks the dolly and ramp to one another. The roll of web material is rolled down the ramp onto the dolly and secured by a strap to anchor points on the dolly. By releasing the latch, the dolly with the roll may be displaced to another station.

10 Claims, 3 Drawing Sheets

LOW PROFILE DOLLY AND RAMP ASSEMBLY FOR A ROLL

TECHNICAL FIELD

The present invention relates to a combined dolly and ramp assembly for carrying a roll of web material from one station to another and particularly relates to a combined dolly and ramp assembly for demounting a roll carrying web material from a skid or other storage facility, transporting the roll to a second station and facilitating removal of the roll from the dolly.

BACKGROUND

In many installations, for example, in printing plants, it is necessary to transport rolls of paper from storage pallets to the printing presses. Rolls of paper in web form typically weigh several hundred pound.,;. It is often desirable to transport the rolls individually rather than in groups. Consequently, it is highly desirable to provide a piece of equipment that enables a worker to easily and safely transport a roll from a stored position, for example, on a pallet, to a useful position, for example, on an unwind machine forming part of the printing process.

Dollies for the transport of rolls carrying web material have been proposed and constructed in the past. For example, U.S. Pat. No. 5,253,972 of common assignee herewith discloses a roll dolly for transporting rolls of this type which employs fluid-actuated devices carried by the dolly for lifting the roll relative to the dolly. While this has proven eminently satisfactory for its designed purpose, a dolly with a fluid-actuated lift is a somewhat complicated and expensive piece of equipment. Additionally, previously used conventional roll doilies do not have appropriate support for the roll carried by the dolly and, not infrequently, roll doilies positioned in front of an unwinder machine forming part of a printing process cause buckling of the floor due to the weight of the paper roll and dolly. In addition, the height of the roll dollies often interfere with the operation of the unwinder and, because of their structure, present additional difficulties or obstacles for the removal of the roll.

DISCLOSURE OF THE INVENTION

In accordance with the present invention, there is provided a combined dolly and ramp assembly having a very low profile which renders it eminently suitable for both offloading a roll from a stored position, for example, on a pallet or skid, onto the dolly and movement of the dolly to a second position or station compatible with the machine, typically an unwind machine, whereby the roll can be readily and easily removed from the dolly directly onto the unwind machine for subsequent removal of the web material. To accomplish the foregoing and to minimize or eliminate the previously discussed and other disadvantages associated with prior dollies, the present invention provides a dolly and ramp which are selectively attachable and detachable relative to one another, particularly to facilitate offloading of the roll from the stored position, i.e., from the pallet or skid, onto the dolly for transport to the second station. More particularly, the ramp includes a pair of laterally spaced arms joined one to the other by an intermediate ramp surface having a front edge corresponding generally to the height of the pallet or skid, i.e., on the order of about 5 inches above the floor. The intermediate ramp surface is downwardly inclined from its forward roll receiving edge and extends rearwardly terminating about midway between the opposite ends of the ramp. Consequently, portions of the arms remote from the receiving edge of the ramp define an opening into which the roll dolly may be positioned for receiving the roll from the ramp.

The roll dolly comprises a body or frame mounting a pair of generally inclined roll-receiving surfaces. The roll dolly is mounted on rollers, preferably casters, and a handle is provided whereby the roll dolly can be maneuvered along the floor and into a position such that one end portion of the dolly is located in the opening between the arms of the ramp. In that position, the forward inclined surface of the roll dolly forms a continuation of the inclined surface of the ramp whereby a roll from the pallet or skid may be rolled down both the ramp surface and the forward surface of the roll dolly. The inclined rear surface of the dolly forms with its forward inclined surface a shallow V-shaped surface configuration which defines support points is on the inclined surfaces for centering the roll when positioned on the roll dolly. An upstanding backstop is provided on the rear end of the dolly to prevent the roll from rolling off the dolly should the roll progress too far along the roll dolly from the ramp. Lateral guides upstand from beth the ramp and the roll dolly and are in alignment one with the other to maintain the roll on the ramp and dolly during movement of the roll from the pallet or skid to the roll dolly. The roll dolly is releasably secured to the ramp by a spring biased latching mechanism, which is preferably foot-operated. Thus, when the roll dolly is inserted between the laterally spaced arms of the ramp, the latch is automatically engaged to retain the roll dolly in position vis-a-vis the ramp such that the roll can be displaced from the pallet to the roll dolly.

Once the roll is on the roll dolly, the roll dolly is detached from the ramp by operation of the foot-operated latch. The roll dolly can then be moved on its casters away from the ramp by a handle attached to the dolly and onto a second station. It will be appreciated that the roll dolly has, like the ramp, a very low profile and with the positioning of the roll adjacent the apex of the inclined surfaces, the roll lies only a short distance off the floor. Also, the dolly does not have any additional structure, such as fluid-actuated mechanisms, for lifting or moving the roll which might otherwise interfere with the machines with which the roll is used, for example, an unwind machine. Thus, when the roll dolly is located adjacent such machine, the roll can be picked up off the dolly and loaded directly onto the unwinder. The dolly can remain in position without interfering with the operation of the unwinder.

It will be appreciated that the handle for the dolly is preferably disposed on the front of the dolly. The front of the dolly also carries a brake pedal such that the dolly can be locked in position against movement along the floor with the roll on the dolly. Additionally, the dolly has four casters, two of which, at one end, may swivel to allow the dolly to be swung in and out of position while the two remaining casters at the opposite end are preferably stationary.

In a preferred embodiment according to the present invention, there is provided a dolly and ramp assembly for enabling transport of a roll comprising a ramp body including a pair of laterally spaced arms and an intermediate ramp connecting the arms to one another and maintaining the arms laterally spaced from one another and a dolly having rollers and a roll support surface. The dolly is selectively movable between a first position with at least a portion of the roll support surface located between the arms and forming substantially a continuation of the ramp and a second position spaced from the ramp body. A latching mechanism is carried by one of the ramp body and the dolly for releasably latching another of the ramp body and the dolly to one another, with the roll support surface portion located between the arms.

In another preferred embodiment according to the present invention, there is provided a dolly and ramp assembly for enabling transport of a roll along a floor comprising a ramp body including an inclined ramp having a forward edge portion elevated above the floor within a range of approximately 4-6 inches and a dolly having rollers and an inclined roll support surface, the dolly being selectively movable between a first position with at least a portion of the roll support surface located to form with a rearward edge portion of the ramp body a continuation of the inclined ramp and a second position spaced from the ramp body. The assembly also includes a latching mechanism carried by one of the ramp body and the dolly for releasably latching another of the ramp body and the dolly to one another, with the; inclined roll support surface portion and the inclined ramp forming a continuous downwardly inclined surface from the forward edge portion of the ramp body. Means are also carried by the dolly for securing the roll to the dolly.

Accordingly, it is a primary object of the present invention to provide a novel and improved combined dolly and ramp assembly for carrying a roll of web material and which assembly has a low profile, may be readily and easily manufactured at low cost, may be operated by a single worker, and does not have any parts which would interfere with the; operation of the machines to which the rolls are transported.

BEST MODE FOR CARRYING OUT THE INVENTION

Figure 1:
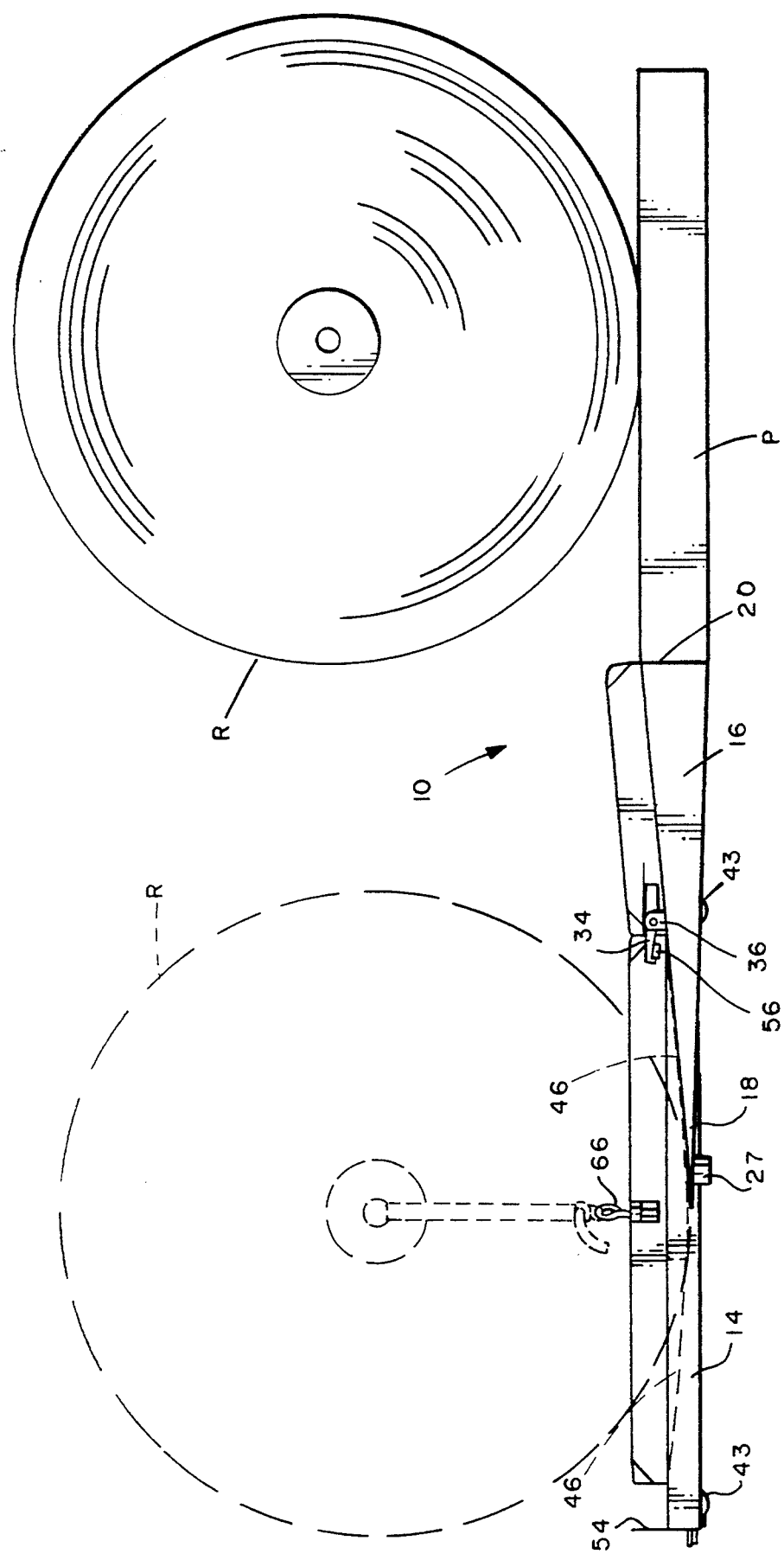
FIG. 1 is a side elevational view of a combined dolly and ramp assembly constructed in accordance with the present invention and illustrating the offloading movement of a roll from a storage position on a pallet.
Figure 2:
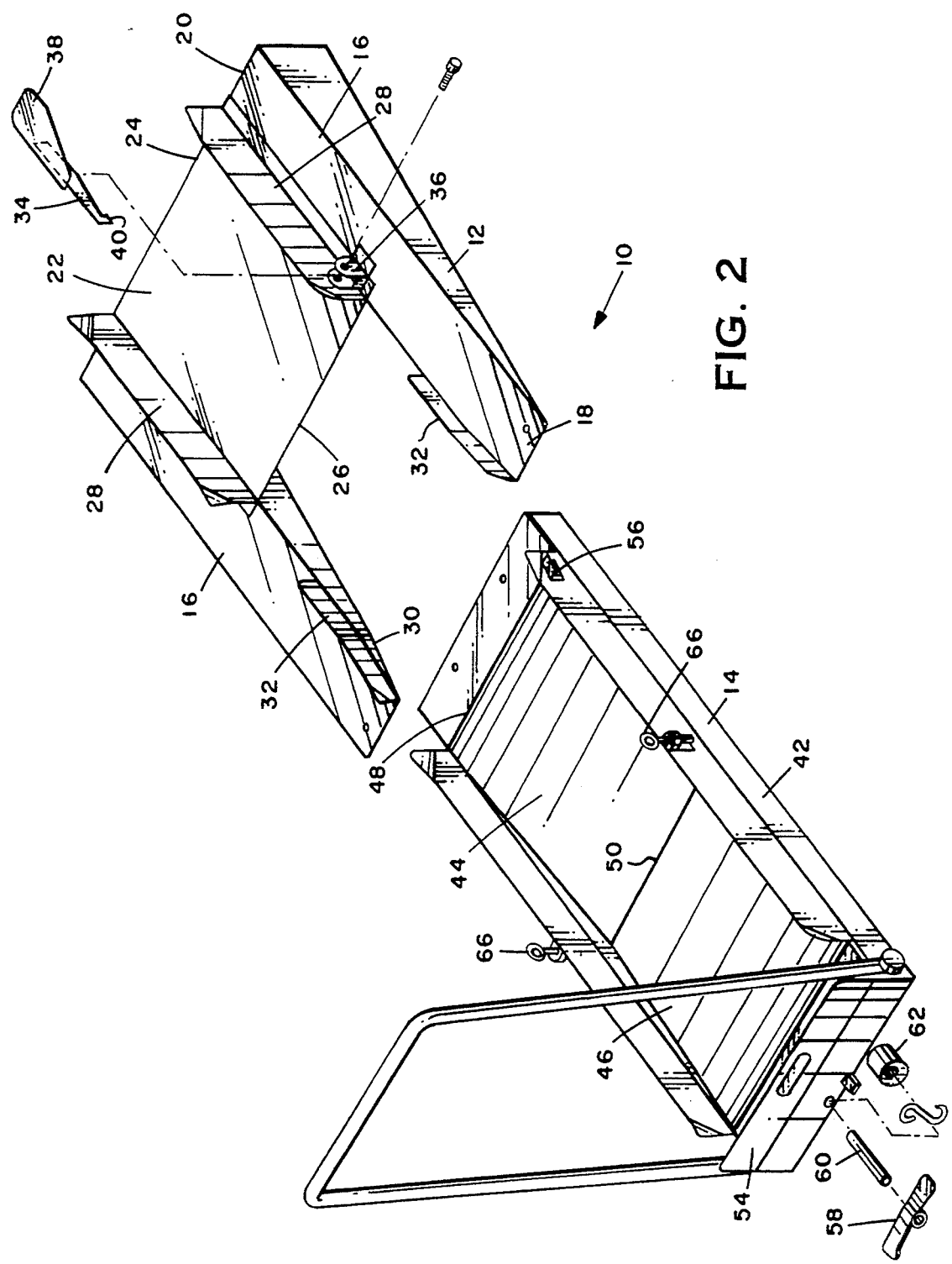
FIG. 2 is a perspective view of the combined dolly and ramp assembly thereof.
Figure 3:
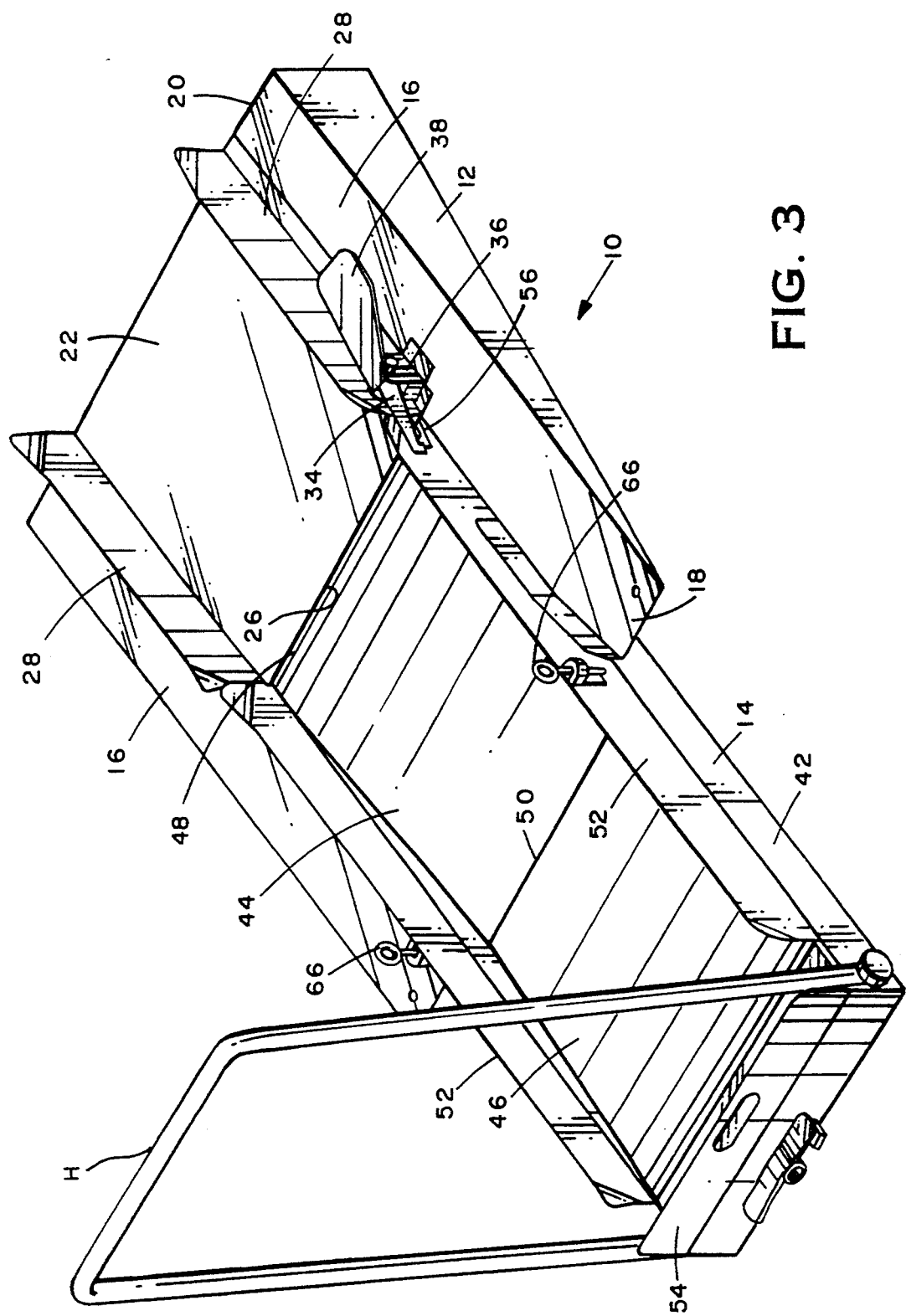
FIG. 3 is a perspective view of the roll dolly and ramp separated one from the other and illustrating various parts thereof in exploded juxtaposition.

Referring now to the drawing figures, there is illustrated a combined low profile dolly and ramp assembly, generally designated 10, and including a ramp 12 and a dolly 14. Ramp 12 includes a pair of laterally spaced arms 16 which are tapered in wedge-like fashion from an end 18 lying generally flush with the floor to the opposite end 20, which is elevated a distance approximately corresponding to the height of a pallet or skid P on which a roll R containing web material is disposed as illustrated in FIG. 1. Thus, the height of end 20 may approximate 4-6 inches and preferably about 5 inches. Joining the arms 16 is an intermediate inclined ramp 22 terminating at its forward end 24 at an elevation corresponding to the elevation of the ends 20 of arms 16.

Ramp 22 is inclined downwardly toward the rear end of the ramp 12 and terminates at its rear edge 26 substantially medially of the length of arms 16. Upstanding guides 28 are formed along the opposite sides of the ramp 22 for guiding the roll from the pallet or skid onto the dolly, as described hereinafter. As illustrated, the lower ends 18 of the arms 16 have inwardly tapered interior surfaces 30, as well as an upstanding guide 32 for facilitating reception of the forward portion of the dolly into the slot defined between the arms 16 and the lower edge 26 of ramp 22, also as described below. The undersides of the arms 16 may have rubber pads 27 or other high friction materials for preventing sliding movement of the ramp relative to the floor.

Ramp 12 also includes a latch 34. Latch 34 is pivoted and is spring biased in a latch support 36 secured along one side of ramp 12 and on an arm 16. The latch 34 is pivoted intermediate its ends. One end includes a generally horizontally disposed flat surface 38 forming a foot pedal for operation of latch 34, while the opposite end includes a hook 40 for engaging over a catch on the roll dolly 14 when the latter is disposed in the position illustrated in FIG. 1. The hook has a tapered surface for engaging the catch and pivoting upwardly against the bias of the latch spring in response to movement of the dolly 14 into the ramp opening whereby the spring returns the latch to automatically engage the catch.

The roll dolly 14 includes an underlying support frame or body having opposite sides 42 and which body is supported on rollers, preferably casters 43, there being a pair of casters at each of the opposite ends of the roll dolly 14. The body or frame 42 of the roll dolly 14 mounts a pair of oppositely inclined upper surfaces 44 and 46. The surfaces 44 and 46 thus form an apex 50 located centrally of the dolly 14. It will be appreciated that the inclined surfaces 44 and 46 provide a four-point mount for the opposite circular sides of the roll of web material R when the latter is positioned on dolly 14. It will be appreciated that the forward end 48 of surface 44 lies at an elevation corresponding substantially to the elevation of the trailing edge 26 of ramp 22. Dolly 14 also includes a pair of upstanding guides 52 along opposite sides of the dolly. A backstop 54 is located along the far or trailing end of dolly 14 and is positioned to prevent movement of the; roll off the dolly adjacent that end.

The guide, 52 on the same side of dolly 14 as latch 34 is relative to ramp 12 includes a catch 56. The catch cooperates with the latch 34 such that when the dolly and ramp are connected one to the other, as illustrated in FIG. 1, the latch end 40 automatically engages the catch 56 as previously described to releasably lock the ramp and dolly one to the other.

A brake is provided at one end of the dolly. The brake includes a brake pedal 58 rotatably mounted to the frame 42. The shaft 60 mounting the brake pedal 58 carries an eccentrically mounted brake surface 62. Preferably, the surface is formed of polyurethane. Thus, by pivoting the brake pedal 58 in one direction, the eccentrically mounted cylindrical brake 62 is brought into engagement with the floor. If the dolly is empty, the brake will, in fact, lift the dolly slightly off the floor. When the dolly is full, i.e., supporting the roll with web material, the polyurethane engages the floor and gives or compresses to create a superior gripping surface. Thus, the brakes acts in a camming fashion relative to the floor in response to rotation of the brake pedal 58.

The dolly mounts four casters 43 adjacent the corners of the dolly. The two casters on the brake end of the dolly preferably swivel to allow the dolly to be swung in and out of position. The two remaining casters on the forward end of the dolly are preferably stationary.

A handle H is provided at the front end of the dolly, i.e., the side with the brake pedal, to facilitate pushing or pulling the dolly. The handle may be retractable, foldable or detachable so that it does not obstruct operation of the unwinder, not shown.

In use, and for example when transporting a roll of web material from a pallet P to an unwinder of a printing machine, the forward end of the ramp is disposed adjacent and up against the pallet supporting the roll, it being appreciated that the roll axis lies horizontally and the ramp is disposed to receive the roll when rolled off the pallet. Once the ramp 12 is positioned, the dolly 14 can be moved into the opening formed by the lower rear ends of arms 16 and automatically latched to the ramp 12. By latching the dolly and ramp one to the other, it will be appreciated that the ramp 22 and the inclined surface 44 form a continuous inclined surface from the upper surface of the pallet. The roll may now be rolled along the ramp 22 and inclined surface 44 for centered engagement at four points along the surfaces 44 and 46. Should the roll be displaced beyond its centrally located position on the dolly vis-a-vis the apex 50, the roll will engage the backstop 54 which prevents any further movement of the roll and prevents it from rolling off the dolly. The roll may be suitably secured to the dolly by straps, not shown, which are anchored at anchoring connections 66 along opposite sides of the dolly and secured to the upstanding guides 52.

To transport the roll on the dolly from the stored station, i.e., adjacent the ramp and pallet, to a use position, i.e., adjacent the unwind machine, the dolly is unlatched from the ramp by operation of the foot pedal 38. The handle is used to roll the dolly from the opening between the arms 16 and to move the dolly with the roll secured on the dolly to the unwind station. The dolly at the unwind station can then be locked in position by operation of brake 58 and the roll removed from the dolly by other mechanisms, not shown.

It will be appreciated that the insertion of the dolly into the slot between the arms not only aligns the ramp 22 with the inclined surface 44 but also aligns the guides 28 and 52 of the ramp and dolly, respectively. Thus, the roll may be guided onto the dolly without danger of the roll rolling off the ramp. Also, the surfaces 32 and inwardly tapered surfaces 30 on the ramp facilitate insertion of the dolly into the opening between arms 16 such that the ramp 22 and surface 44 move into continuous alignment one with the other.

In a preferred form of the present invention, the ramp 12 may have a length and width of about 34 inches. The height of the ramp at the receiving end of the ramp may be about 5 inches. The dolly has a maximum width of approximately 19 inches and a maximum height at the forward end of the dolly of 2.5 inches so that it may be aligned with the trailing end of ramp 22. The length of the dolly may be 48 inches. With this configuration, rolls having a diameter up to 52 inches and a width of about 18 inches may be accommodated on the ramp and dolly assembly as described.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dolly and ramp assembly for enabling movement of a roll from a support onto the dolly and subsequent transport by the dolly, comprising:
    a ramp body including a pair of laterally spaced arms and an intermediate inclined ramp connecting the arms to one another and maintaining said arms laterally spaced from one another, said inclined ramp having a rearward edge terminating short of rearward ends of said arms;
    a dolly having rollers and a roll support surface, said dolly being selectively movable between a first position with at least a portion of said roll support surface located between said arms to form with said rearward edge a continuation of said intermediate inclined ramp for enabling movement of the roll from the support along the inclined ramp and roll support surface portion onto the dolly and a second position spaced from said ramp body; and
    a latching mechanism cooperable between said ramp body and said dolly for releasably latching said ramp body and said dolly to one another, with said roll support surface portion located between said arms.

2. An assembly according to claim 1 wherein said roll support surface of said dolly includes a pair of diverging surface portions forming an apex at their juncture for centering the roll on the dolly, one of said diverging surface portions forming said roll support surface.

3. An assembly according to claim 1 wherein said dolly includes a brake for braking movement of the dolly.

4. An assembly according to claim 1 including a pair of upstanding guides carried by said ramp body for maintaining the roll on the intermediate ramp.

5. An assembly according to claim 1 including a pair of upstanding guides carried by said dolly for maintaining the roll on the roll support surface of said dolly.

6. An assembly according to claim 1 including a first pair of upstanding guides carried by said ramp body for maintaining the roll on the intermediate ramp, a second pair of upstanding guides carried by said dolly for maintaining the roll on the roll support surface of said dolly, said first and second pairs of guides being aligned with one another when the dolly and ramp are releasably latched to one another.

7. An assembly according to claim 1 including an upstanding backstop carried by said dolly adjacent an end thereof remote from said ramp body when the ramp body and dolly are releasably attached to one another.

8. An assembly according to claim 1 including a pair of supports secured to said dolly along opposite sides thereof for facilitating securement of the roll to said dolly.

9. An assembly according to claim 1 including a handle carried by said dolly.

10. An assembly according to claim 1 wherein said roll support surface of said dolly includes a pair of diverging surface portions forming an apex at their juncture for centering the roll on the dolly, said dolly including a brake for braking movement of the dolly including a first pair of upstanding guides carried by said ramp body for maintaining the roll on the intermediate ramp, a second pair of upstanding guides carried by said dolly for maintaining the roll on the roll support surface of said dolly, said first and second pairs of guides being aligned with one another when the dolly and ramp are releasably latched to one another and including a handle carried by said dolly.

* * * * *